United States Patent
Ackermann et al.

(10) Patent No.: US 11,755,633 B2
(45) Date of Patent: Sep. 12, 2023

(54) ENTITY SEARCH SYSTEM

(71) Applicant: International Business Machines Corporation, Armonk, NY (US)

(72) Inventors: Christopher F. Ackermann, Fairfax, VA (US); Charles E. Beller, Baltimore, MD (US); Michael Drzewucki, Woodbridge, VA (US); Kristen Maria Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 17/034,190

(22) Filed: Sep. 28, 2020

(65) Prior Publication Data

US 2022/0100785 A1    Mar. 31, 2022

(51) Int. Cl.
*G06F 16/33* (2019.01)
*G06F 40/211* (2020.01)

(52) U.S. Cl.
CPC ........ *G06F 16/3344* (2019.01); *G06F 40/211* (2020.01)

(58) Field of Classification Search
CPC ........................... G06F 16/3344; G06F 40/211
See application file for complete search history.

(56) References Cited

U.S. PATENT DOCUMENTS

| | | | |
|---|---|---|---|
| 5,386,556 A | 1/1995 | Hedin | |
| 7,685,201 B2 | 3/2010 | Zeng | |
| 8,370,128 B2 | 2/2013 | Brun | |
| 9,552,352 B2 | 1/2017 | Viegas | |
| 9,772,992 B2 | 9/2017 | Cucerzan | |
| 10,410,139 B2 | 9/2019 | Kanani | |
| 2019/0057154 A1* | 2/2019 | Philip | G06F 16/9535 |
| 2019/0286697 A1 | 9/2019 | Boxwell | |

(Continued)

FOREIGN PATENT DOCUMENTS

| CN | 108170662 A | 6/2018 |
|---|---|---|
| EP | 387226 A1 | 9/1990 |

OTHER PUBLICATIONS

Ahlers, Dirk, "Business Entity Retrieval and Data Provision for Yellow Pages by Local Search", Mar. 24, 2013, 6 pages.

(Continued)

*Primary Examiner* — Mark D Featherstone
*Assistant Examiner* — Ranjit P Doraiswamy
(74) *Attorney, Agent, or Firm* — Willam H. Hartwell; Jared L. Montanaro (57) ABSTRACT

A computer device receives a request to search a corpus of documents for an entity, wherein the request includes a non-name identifier of the entity. The computing device identifies entries of text within the corpus of documents that reference the non-name identifier. The computing device applies natural language processing (NLP) to content associated with the identified entries within the corpus of documents, wherein the NLP identifies candidate entities associated with the non-name identifier. The computing device selects an entity from the candidate entities based, at least in part, on distances between the candidate entities and references to the non-name identifier in the identified entries. The computing device returns the selected entity to a submitter of the request.

17 Claims, 6 Drawing Sheets

(56) References Cited

U.S. PATENT DOCUMENTS

2019/0392082 A1* 12/2019 Bell .................. G06N 3/08

OTHER PUBLICATIONS

Mell et al., "The NIST Definition of Cloud Computing", Recommendations of the National Institute of Standards and Technology, NIST Special Publication 800-145, Sep. 2011, 7 pages.
"Entity Search System", European Patent Application No. EP2021/070432, filed on Jul. 21, 2021, 31 pages.
Patent Cooperation Treaty PCT Notification of Transmittal of the International Search Report and the Written Opinion of International Searching Authority, or the Declaration, International application No. PCT/EP2021/070432, International filing date Jul. 21, 2021 (Jul. 21, 2021), dated Oct. 5, 2021 (dated Oct. 5, 2021), 11 pages.
Slawski, Bill, "Entity Recognition In Queries at Google", Go Fish Digital, Posted Feb. 4, 2016, 5 pages, <https://gofishdigital.com/google-entity-recognition/>.

* cited by examiner

ENTITY SEARCH SYSTEM

STATEMENT REGARDING FEDERALLY SPONSORED WORK

This invention was made with United States Government support under contract number 2018-18010800001. The Government has certain rights to this invention.

BACKGROUND OF THE INVENTION

The present invention relates generally to the field of data classification, and more particularly entity searching based on data classification.

Generally, entity searches are text-based searches against unstructured corpuses to identify subjects within different domains. The user searches a corpus using a name of an entity with an expectation to find information pertaining to that entity.

SUMMARY

Embodiments of the present invention provide a method, system, and program product.

A first embodiment encompasses a method where one or more processors receive a request to search a corpus of documents for an entity, wherein the request includes a non-name identifier of the entity. The one or more processors identify entries of text within the corpus of documents that reference the non-name identifier. The one or more processors apply natural language processing (NLP) to content associated with the identified entries within the corpus of documents, wherein the NLP identifies candidate entities associated with the non-name identifier. The one or more processors select an entity from the candidate entities based, at least in part, on distances between the candidate entities and references to the non-name identifier in the identified entries. The one or more processors return the selected entity to a submitter of the request.

A second embodiment encompasses a computer program product that includes one or more computer-readable storage media and program instructions stored on the one or more computer-readable storage media. The program instructions include program instructions to receive a request to search a corpus of documents for an entity, wherein the request includes a non-name identifier of the entity. The program instructions include program instructions to identify entries of text within the corpus of documents that reference the non-name identifier. The program instructions include program instructions to apply natural language processing (NLP) to content associated with the identified entries within the corpus of documents, wherein the NLP identifies candidate entities associated with the non-name identifier. The program instructions include program instructions to select an entity from the candidate entities based, at least in part, on distances between the candidate entities and references to the non-name identifier in the identified entries. The program instructions include program instructions to return the selected entity to a submitter of the request.

A third embodiment encompasses a computer system that includes one or more computer processors, one or more computer-readable storage media, and program instructions stored on the computer-readable storage media for execution by at least one of the one or more processors. The program instructions include program instructions to receive a request to search a corpus of documents for an entity, wherein the request includes a non-name identifier of the entity. The program instructions include program instructions to identify entries of text within the corpus of documents that reference the non-name identifier. The program instructions include program instructions to apply natural language processing (NLP) to content associated with the identified entries within the corpus of documents, wherein the NLP identifies candidate entities associated with the non-name identifier. The program instructions include program instructions to select an entity from the candidate entities based, at least in part, on distances between the candidate entities and references to the non-name identifier in the identified entries. The program instructions include program instructions to return the selected entity to a submitter of the request.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention provide for entity searching against a corpus of documents utilizing data that is related to an expected entity name to be found. Additionally, embodiments of the present invention allow for searching when a user is not aware of the actual entity name, but only a piece of identifying information (e.g., identifier) related to the entity name. For example, various embodiments use queries of corpus documents to retrieve passages of text that include the identifier, and then extract the entity name from those passages based on the entity name's relationship to the identifier.

Embodiments of the present invention provide a technological improvement over known solutions for entity recognition in an unlabeled corpus. Embodiments of the present invention provide servers and systems that improve over conventional systems by providing a more efficient classification of data, thereby reducing overall system load. Embodiments of the present invention recognize that the systems disclosed herein would see a decrease in load because the systems utilize less processing power and would provide users a more comprehensive ability to identify entity mentions, thus reducing the amount of time users spend searching/reviewing possible entity mentions, which again, reduces overall system load.

The present invention will now be described in detail with reference to the Figures.

Figure 1:
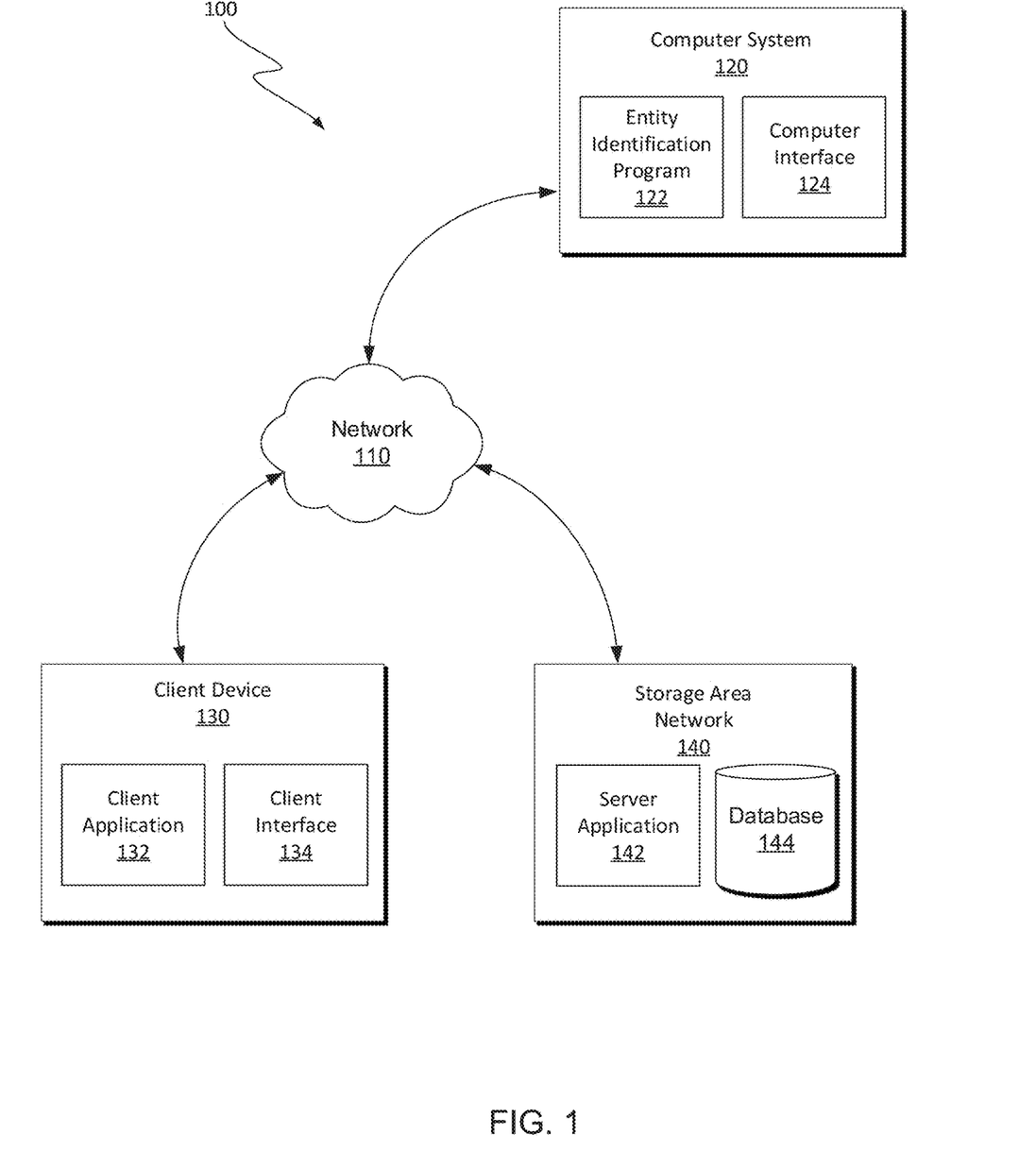
FIG. 1 is a functional block diagram illustrating a computing environment, in which a computing device generates an entity profile based on, at least, an identifier search within a corpus of unstructured documents, in accordance with an embodiment of the present invention.

FIG. 1 is a functional block diagram illustrating a computing environment, generally designated 100, in accordance with one embodiment of the present invention. Computing environment 100 includes computer system 120, client device 130, and storage area network (SAN) 140 connected over network 110. Computer system 120 includes entity identification program 122 and computer interface 124. Client device 130 includes client application 132 and client interface 134. Storage area network 140 includes server application 142 and database 144.

In various embodiments of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing entity identification program 122 and computer interface 124. Computer system 120 may include internal and external hardware components, as described in further detail with respect to FIG. 6.

In this exemplary embodiment, entity identification program 122 and computer interface 124 are stored on computer system 120. However, in other embodiments, entity identification program 122 and computer interface 124 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, client device 130, and SAN 140, and various other computer systems (not shown), in accordance with desired embodiment of the present invention.

In the embodiment depicted in FIG. 1, entity identification program 122, at least in part, has access to client application 132 and can communicate data stored on computer system 120 to client device 130, SAN 140, and various other computer systems (not shown). More specifically, entity identification program 122 defines a user of computer system 120 that has access to data stored on client device 130 and/or database 144.

Entity identification program 122 is depicted in FIG. 1 for illustrative simplicity. In various embodiments of the present invention, entity identification program 122 represents logical operations executing on computer system 120, where computer interface 124 manages the ability to view these logical operations that are managed and executed in accordance with entity identification program 122. In some embodiments, entity identification program 122 represents system that processes and analyzes unstructured and structured data. Additionally, entity identification program 122, when executing data analysis, operates to derive data from a corpus of unstructured documents and identify a set of entities that were extracted based on, at least, an automated entity and relationship extraction (e.g., statistical information and relation extraction (SIRE)).

Computer system 120 includes computer interface 124. Computer interface 124 provides an interface between computer system 120, client device 130, and SAN 140. In some embodiments, computer interface 124 can be a graphical user interface (GUI) or a web user interface (WUI) and can display, text, document, web browsers, windows, user options, application interfaces, and instructions for operation, and includes the information (such as graphic, text, and sound) that a program presents to a user and the control sequences the user employs to control the program. In some embodiments, computer system 120 accesses data communicated from client device 130 and/or SAN 140 via a client-based application that runs on computer system 120. For example, computer system 120 includes mobile application software that provides an interface between computer system 120, client device 130, and SAN 140. In various embodiments, computer system 120 communicates the GUI or WUI to client device 130 for instruction and use by a user of client device 130.

In various embodiments, client device 130 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing client application 132 and client interface 134. Client device 130 may include internal and external hardware components, as described in further detail with respect to FIG. 6.

Client application 132 is depicted in FIG. 1 for illustrative simplicity. In various embodiments of the present invention client application 132 represents logical operations executing on client device 130, where client interface 134 manages the ability to view these various embodiments, client application 132 defines a user of client device 130 that has access to data stored on computer system 120 and/or database 144.

Storage area network (SAN) 140 is a storage system that includes server application 142 and database 144. SAN 140 may include one or more, but is not limited to, computing devices, servers, server-clusters, web-servers, databases and storage devices. SAN 140 operates to communicate with computer system 120, client device 130, and various other computing devices (not shown) over a network, such as network 110. For example, SAN 140 communicates with entity identification program 122 to transfer data between computer system 120, client device 130, and various other computing devices (not shown) that are not connected to network 110. SAN 140 can be any computing device or a combination of devices that are communicatively connected to a local IoT network, i.e., a network comprised of various computing devices including, but are not limited to computer system 120 and client device 130, to provide the functionality described herein. SAN 140 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments some of the features of computer system 120 are included as part of SAN 140 and/or another computing device.

Additionally, in some embodiments, SAN 140 and computer system 120 represent, or are part of, a cloud computing platform. Cloud computing is a model or service deliver for enabling convenient, on demand network access to a shared pool of configurable computing resources (e.g., networks, network bandwidth, servers, processing, memory, storage, applications, virtual machines, and service(s) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and ca be implemented as various deployment models as a private cloud, a community cloud, a public cloud, and a hybrid cloud. In various embodiments, SAN 140 represents a database or website that includes, but is not limited to, data associated with weather patterns.

SAN 140 and computer system 120 are depicted in FIG. 1 for illustrative simplicity. However, it is to be understood that, in various embodiments, SAN 140 and computer system 120 can include any number of databases that are managed in accordance with the functionality of entity identification program 122 and server application 142. In general, database 144 represents data and server application 142 represents code that provides an ability to use and modify the data. In an alternative embodiment, entity identification program 122 can also represent any combination of the aforementioned features, in which server application 142 has access to database 144. To illustrate various aspects of the present invention, examples of server application 142 are presented in which entity identification program 122 represents one or more of, but is not limited to, unstructured and structured data classification based on, at least, metadata.

In some embodiments, server application 142 and database 144 are stored on SAN 140. However, in various embodiments, server application 142 and database 144 may be stored externally and accessed through a communication network, such as network 110, as discussed above.

In various embodiments, a user of client device 130 utilizes client application 132 to generate an entity profile request, wherein the request is communicated to entity identification program 122 executing on computer system 120. In various embodiments, the entity profile request represents a request to search a corpus of unstructured documents to identify an entity based on, at least, one or more identifiers other than the entity's name (i.e., is an identifier that is not associated with the entity name "non-name"). In various embodiments, the identifiers represent content associated with the entity which includes, but is not limited to, (i) phone numbers, (ii) physical addresses, (iii) email addresses, (iv) aliases, (v) professional organizations, (vi) professional work-related entities.

In various embodiments, entity identification program 122 receives the entity profile request from client application 132. Entity identification program 122 analyzes the entity profile request and identifies the one or more identifiers to be utilized to search the corpus of unstructured documents to locate known and associated entities.

Various embodiments of the present invention also provide a system for expanding a query. For example, entity identification program 122 identifies an entity associated with the one or more identifiers and then entity identification program 122 executes a search for content associated with the entity, wherein the search results are expanded from identifying entity mentions (i.e., entity mentions that are candidate entity names that are associated with the identifiers, "candidate entity") that involve the one or more identifiers to identifying all content associated with the entity.

In various embodiments, entity identification program 122 utilizes a corpus of unstructured documents stored on database 144 to perform a search for entities based on, at least, the one or more identifiers. Additionally, entity identification program 122 utilizes an automated entity and relationship extraction method (e.g., statistical information and relation extraction (SIRE)) to extract the entities based on the search results of the one or more identifiers.

In various embodiments, entity identification program 122 receives one or more identifiers from a user of client device 130 based on, at least, the entity profile request. In various embodiments entity identification program 122 analyzes the one or more identifiers to identify the context of the one or more identifiers. In various embodiments, entity identification program 122 identifies the expressions of the one or more identifiers and expands the query input based on, at least, the identified expressions. Embodiments of the present invention recognize that identifiers (i.e., is an identifier that is not associated with the entity name "non-name"), similar to names, occur in various forms in natural language text. In various embodiments, email addresses may be written with the following types of expressions that include, but are not limited to, the "at" symbol: "@", "AT", and "[AT SYMBOL]." Similarly, in various embodiments, phone numbers can be written in ways that include, but are not limited to, "(123) 456 7890", "1234567890", and "123-456-7890." Embodiments of the present invention provide that if a corpus is only queried based on, at least, the exact match of the one or more identifiers provided, then recall of the identifier mentions will be lower. In various embodiments, entity identification program 122 expands upon the provided one or more identifiers to other likely variants, wherein the expansion is associated with the class of identifier. In various embodiments, the class of the identifier includes, but is not limited to, (i) phone numbers, (ii) physical address, (iii) email addresses, (iv) associations (e.g., professional and personal organizations the entity is associated with), etc. Embodiments of the present invention provide that in some instances the class of the identifier is detected automatically, while in other instances the class of the identifier is queried based on the exact identifier provided.

In various embodiments, entity identifier program 122 queries a corpus of unstructured documents stored on database 144 with the one or more identifiers and receives one or more passages of text from the query. In various embodiments, entity identifier program 122 executes a text search to identify occurrences of (i) the one or more identifiers and (ii) the one or more variants of the identifiers, as discussed above. In various embodiments, the text search returns passages of text in which the identifiers or variants of the identifiers are mentioned. Embodiments of the present invention provide that passages of text represent text in a document that surrounds the mention of the identifiers or the variants of the identifiers. Generally, the passage of text encompasses a plurality of sentences around the mention of the identifiers or the variants of the identifiers. One having ordinary skill in the art would understand that the passages of text represent (i) one or more sentences before the mention of the identifiers or the variants of the identifiers and (ii) one or more sentences after the mention of the identifiers or the variants of the identifiers.

In various embodiments, entity identification program 122 retrieves the one or more passages, as discussed above, analyzes the passages utilizing, at least, a natural language processor (NLP), and identifies one or more entities contained within the one or more passages. In various embodiments, entity identification program 122 further utilizes, at least, SIRE to extract the entity mentions from the one or more passages. Embodiments of the present invention provide that the entity mentions represent a mechanism by which the entity associated with identifier is determined.

In various embodiments, entity identification program 122 utilizes the extracted entities to discover entity mentions that may have been overlooked during the query for entities based on, at least, the identifiers or variants of the identifiers. Embodiments of the present invention recognize that statistical and rule-based entity extraction tools (e.g., SIRE) are capable of overlooking entity mentions in the initial query, wherein if entity mentions are overlooked the identifiers may be erroneously associated with another entity mention that is unrelated to the identifiers or the variants of the identifiers. In various embodiments, entity identification program 122 executes a system to identify entities overlooked by the initial entity extraction. In various embodiments, entity identification program 122 collects the names of all entities extracted from the one or more passages of the initial query utilizing the identifiers or the variants of the identifiers. In various embodiments, entity identification program 122 analyzes the one or more passages of the initial query and identifies full or partial text associated with the extracted entities. Additionally, entity identification program 122 correlates each individual identified full or partial text that is associated with the extracted entities with the one or more entity mentions in which the one or more entity mentions occur within the full or partial text. Embodiments of the present invention recognize that the result of including the full or partial text associated with extracted entities provides an increased threshold value for determining the correct entity associated with the identifiers of the variants of the identifiers.

In various embodiments, entity identification program 122 assesses the distance of each entity mention to the closest identifier contained within the one or more passages. In various embodiments, entity identification program 122 identifies that each individual entity has one or more entity mentions associated with the entity contained within the one or more passages, and for each individual entity mention the identifier that is closest to that entity mention is determined. In various embodiments, entity identification program 122 then calculates the distance between the entity mention and the closest identifier. Embodiments of the present invention provide that the distances between the entity mention and the closest identifier can be calculated based on, for example: (i) character or token distance, (ii) syntactic distance (e.g., calculated using a syntactic parse tree), or (iii) a combination of character/token distance and syntactic distance. Embodiments of the present invention further provide that the combination of character/token distance and syntactic distance can be adjusted to increase the accuracy of identifying the entities. In various embodiments, entity identification program 122 calculates the token distance by analyzing the positions of the identifiers and the entity name within the one or more passages of text and subtracts the entity name from the identifier position. For example, to calculate the token distance between the entity name "Friendly Park" and the identifier "123-456-7890", as follows: token_distance("Friendly Park", "123-456-7890")=11−9=2.

In various embodiments, entity identification program 122 determines the entity that is most likely associated with the identifier or the variants of the identifier. In various embodiments, the set of distances between each entity name, which is determined by the entity mentions, is then utilized to calculate an entity score that indicates the degree to which the entity name is associated with the identifiers or the variants of the identifiers. In various embodiments, the entity score is calculated by dividing one over the total sum of the distances for all entity mentions. In various embodiments, the entity score appears as follows.

$$\text{entity\_score}(\text{"Entity Name"}, \text{"Identifiers"}) = \frac{1}{\text{sum(entity distances)}} \quad \text{Equation (1)}$$

In various embodiments, the formula recognizes entity mentions that are in close proximity to the identifier and further recognizes entity names with many corresponding mentions. Embodiments of the present invention provide that an entity name that is more often mentioned in close proximity to the identifier is more likely to be associated with that identifier, therefore, the entity with the highest score is taken to be the name associated with the identifier.

In various embodiments, entity identification program 122 queries the corpus of documents for mentions of the best-fit entity name. In various embodiments, entity identification program 122 searches the corpus of documents stored on database 144 for mentions of the entity name with the highest score as determined by the formula, as discussed above. Embodiments of the present invention recognize that the query results include mentions of the identifier or variants of the identifier, and all mentions of the entity name. In various embodiments, the new query, as discussed above, is a disjunctive query that includes (i) the original identifier input and (ii) the determined entity name. In various embodiments, only the entity name queried is submitted and the results are integrated into the previous existing query from the initial identifiers or variants of the identifiers. In various embodiments, the top 'N' entity names by score (e.g., the score calculated by the formula as discussed above) are submitted as separate entity name queries and the results are presented as distinct candidate result sets.

In various embodiments, entity identification program 122 generates an entity profile based on, at least, the results of the new query. In various embodiments, the entity profile includes, but is not limited to, (i) the best-fit entity name and the passages within which the best-fit entity name are contained, (ii) a list of the entity names that had a threshold value less than or equal to the best-fit entity name, and (iii) a list of entity names associated with the best-fit entity name. In various embodiments, entity identification program 122 communicates the entity profile to the user of client device 130 for review.

Figure 2:
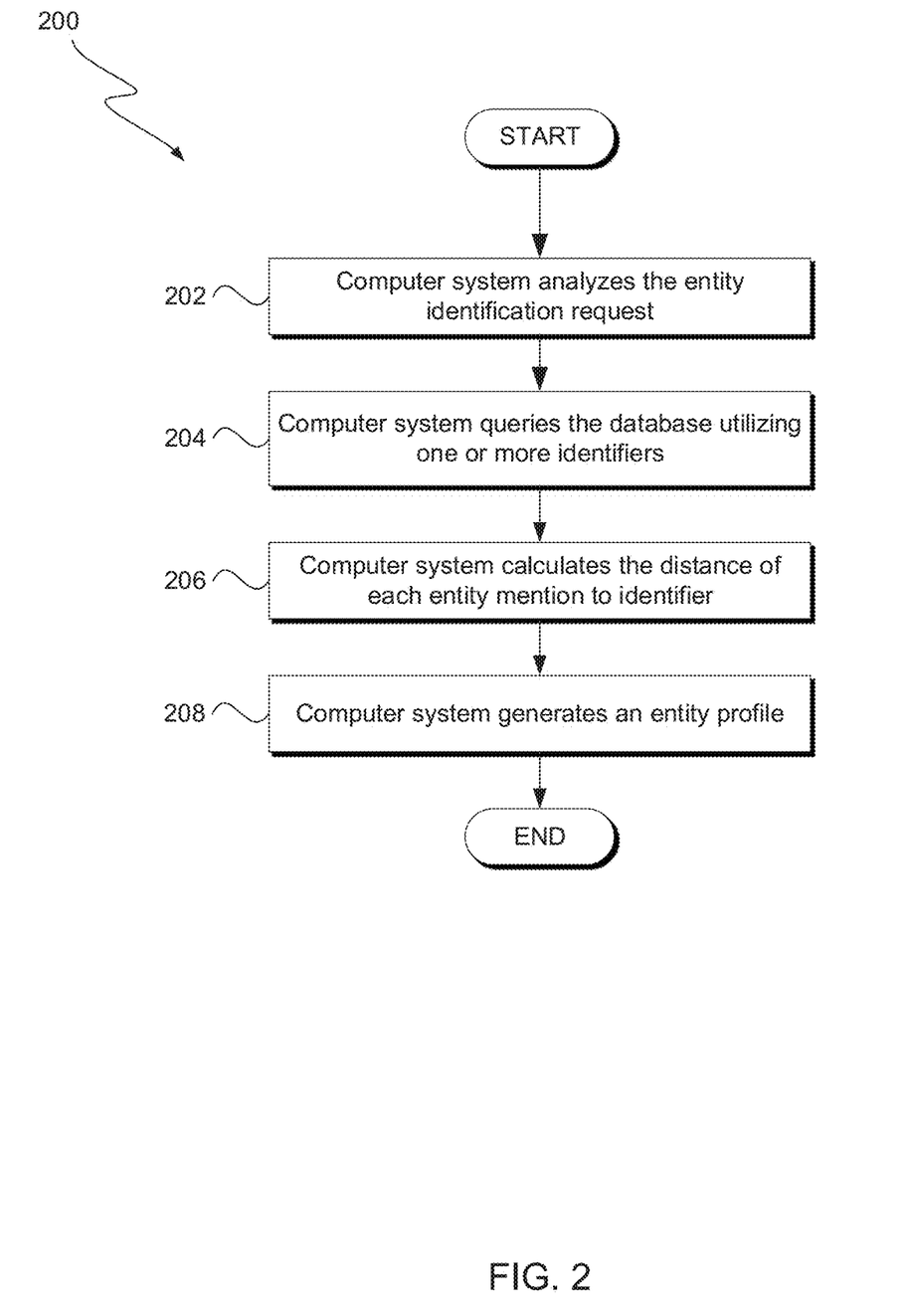
FIG. 2 illustrates operational processes of executing a system for an entity profile, on a computing device within the environment of FIG. 1, in accordance with an embodiment of the present invention.

FIG. 2 is a flowchart, 200, depicting operations of data classifier program 122 in computing environment 100, in accordance with an illustrative embodiment of the present invention. FIG. 2 also represents certain interactions between data classifier program 122 and client application 132. In some embodiments, the operations depicted in FIG. 2 incorporate the output of certain logical operations of data classifier program 122 executing on computer system 120. It should be appreciated that FIG. 2 provides an illustration of one implementation and does not imply any limitations with regard to the environments in which different embodiments may be implemented. Many modifications to the depicted environment may be made. In one embodiments, the series of operations in FIG. 2 can be performed in any order. In another embodiment, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operation 202, entity identification program 122 analyzes the entity identification request. In various embodiments, entity identification program 122 identifies one or more identifiers (i.e., an identifier is not associated with the entity name, "non-name") contained within the request. Additionally, entity identification program 122 expands upon the one or more identifiers and identifies variations to the one or more identifiers that occur in natural language text. In various embodiments, the variations of the one or more identifiers represent expressions that include, but not limited to, the "at" symbol: "@", "AT", and "[AT SYMBOL]." Similarly, in various embodiments, phone numbers can be written as such that include, but not limited to, "(123) 456 7890", "1234567890", and "123-456-7890." Embodiments of the present invention recognize that identifiers include any form of natural language text can be utilized to identify an entity name based on, at least, a query of a corpus of documents, as discussed in later operations.

In operation 204, entity identification program 122 queries the database utilizing one or more identifiers. In various embodiments, entity identification program 122 queries a corpus of documents stored on database 144 utilizing, at least, the identifiers or variants of the identifiers identified in the request. In various embodiments, entity identification program 122 receives one or more passages that include the identifiers or variants of the identifiers. In various embodiments, entity identification program 122 utilizes an extraction method such as, but is not limited to, statistical information and relation extraction (SIRE), to identify and extract entity mentions (i.e., entity mentions that are candidate entity names that are associated with the identifiers, "candidate entity") within the one or more passages as the entity mentions relate to the identifiers or variants of the identifiers.

In various embodiments, entity identification program 122 utilizes the extracted entity mentions to locate entity mentions and additional information elsewhere in the corpus of documents that may have been overlooked. In various embodiments, entity identification program 122 searches through the corpus of documents stored on database 144 to identify and extract the entity names discovered within the passages that contain the identifiers or variants of the identifiers. In various embodiments, entity identification program 122 identifies full or partial text from the passages that match the entity mentions identified, as discussed above. Entity identification program 122 correlates each entity name identified from the passages with the one or more entity mentions in which the one or more entity mentions occur within the passages. In various embodiments, based on, at least, the entity names discovered within the passages, entity identification program 122 identifies additional information relating to the entity name. In various embodiments, entity identification program 122 analyzes the corpus of documents to further identify information relating to the entity name. In various embodiments, the entity name might not appear within passages representing information about the entity name, however, the additional information may be connected to the entity name and would be located within a threshold distance to the identifier or the variants of the identifier. In various embodiment, the additional information relating to the entity name includes, but not limited to, (i) names/titles, (ii) physical addresses, (iii) occupations, (iv) contact information, (v) associated entertainment/recreational activities, etc. In one example embodiment, entity identification program 122 searches the corpus of documents for an entity name relating to the identifier phone number (123) 456-7890 and entity identification program 122 identifies the entity name: John Doe. Additionally, in this example embodiment, entity identification program 122 further identifies additional information relating to John Doe that includes, but is not limited to, (i) John Doe is a web developer, (ii) social media pages relating to John Doe the web developer, and (iii) projects that John Doe has completed, etc.

In operation 206, entity identification program 122 calculates the distance of each entity mention and the additional information to identifiers. In various embodiments, entity identification program 122 identifies that each individual entity name has one or more entity mentions associated with it. In various embodiments, entity identification program 122 determines the closest identifier to the entity mention, where entity identification program 122 then calculates the distance between the entity mention and the closest identifier. Embodiments of the present invention recognize that the distance can be calculated based on, but not limited to, (i) characters or tokens, (ii) a syntactic parse tree, and (iii) a combination of characters or tokens and a syntactic parse tree, wherein the combination can be adjusted to provide a threshold level of accuracy to the distance.

In various embodiments, entity identification program 122 calculates an entity score for each determined entity name. In various embodiments, the set of distances for each entity name is utilized to calculate a score that indicates a degree to which the entity name is associated with the identifier. In various embodiments, entity identification program 122 calculates the entity score by dividing one over the total sum of the distances for all entity mentions. Embodiments of the present invention recognize that the calculations prioritize entity mentions that are closest to an identifier or variants of the identifier and prioritize entity names with a greater number of corresponding entity mentions. Embodiments of the present invention recognize that an entity name that is more often mentioned in close proximity to the identifiers or variants of the identifiers are more likely to be associated with that identifier, wherein the entity name with the highest score is taken to be the name most likely associated with the identifiers or variants of the identifiers.

In operation 208, entity identification program 122 generates an entity profile. In various embodiments, entity identification program 122 searches the corpus of documents stored on database 144 for mentions of the entity name with the highest calculated score, as determined in the previous operations. In various embodiments, the results of the query based on, at least, the entity name include, at least, (i) the mentions of the identifier, and (ii) all mentions associated with the entity name. In various embodiments, entity identification program 122 generates an entity profile that includes, but is not limited to, (i) the best-fit entity name and the passages in which the best-fit entity name are contained, (ii) a list of the entity names that had a threshold value less than or equal to the best-fit entity name, and (iii) a collection of information related to the identified additional information. In various embodiments, entity identification program 122 communicates the entity profile to the user of client device 130 with instructions instructing the user to review the entity profile and learn from the results of the queries.

Figure 3:
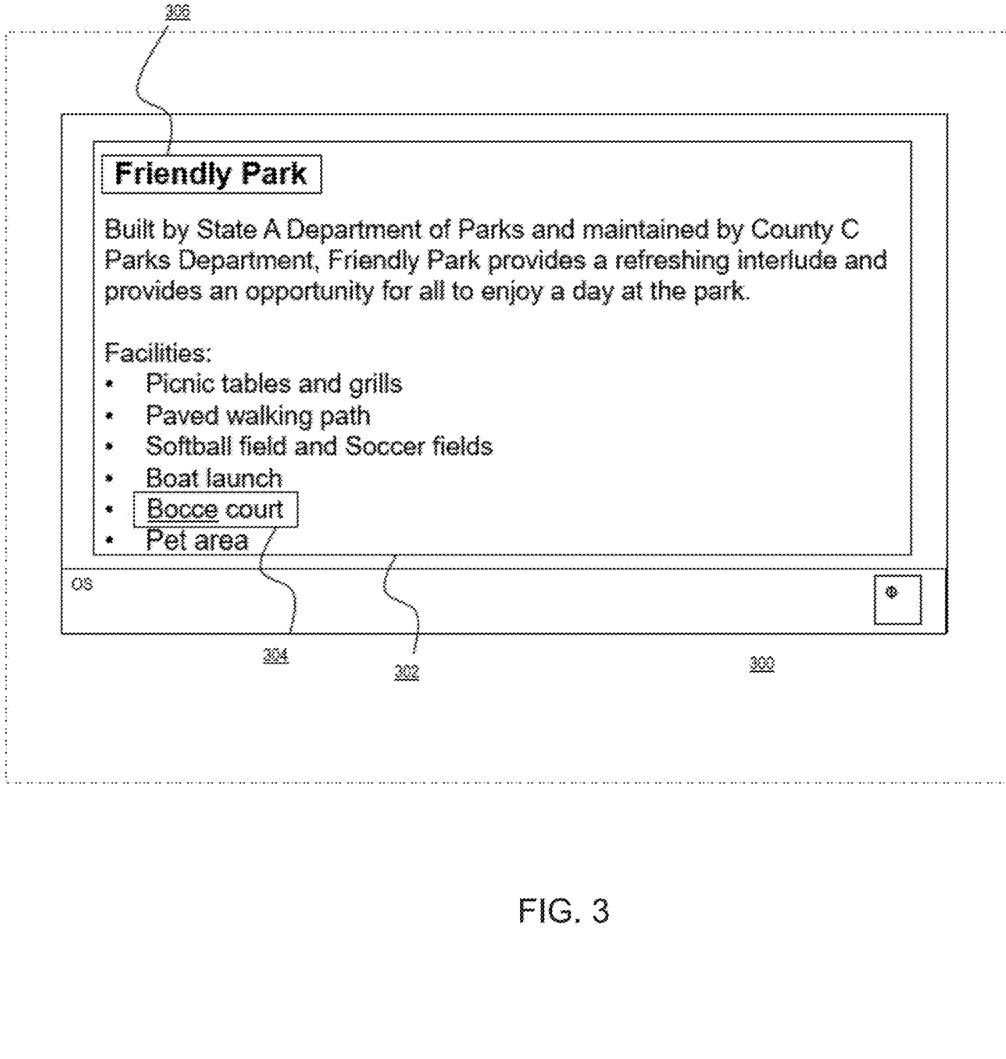
FIG. 3 depicts a block diagram illustrating a screenshot of a computing device, in accordance with an embodiment of the present invention.

FIG. 3 depicts a block diagram of screen shot 300 of a computing device (e.g., computing device 130), wherein screen shot 300 illustrates a passage of text based on, at least, a query of a corpus of documents by entity identification program 122. Embodiments of the present invention recognize that the passage of text is a digital file that is stored on database 144. Additionally, screen shot 300 is depicted for illustrative simplicity and the present invention is not limited, hereto. FIG. 3 illustrates a screen shot of a passage of text identified by entity identification program 122 which includes passage 302 (i.e., passage of text from a digital document), identifier or variation of identifier 304 (i.e., is an identifier that is not associated with the entity name, "non-name"), and entity name 306.

In various embodiments, entity identification program 122 receives an entity identification request from computing device 130 and entity identification program 122 identifies one or more identifiers (e.g., identifier or variant of identifier 304) contained within the request. In various embodiments, entity identification queries database 144 utilizing the one or more identifiers, wherein the query searches through a corpus of documents stored on database 144. In various embodiments, passages are identified that contain the one or more identifiers and are extracted from the corpus of documents. In various embodiments, entity identification program 122 extracts the entity mentions within the one or more passages utilizing an extraction method such as, but not limited to, SIRE. Embodiments of the present invention provide that the entity mentions relate to the identifier or variants of the identifiers. In various embodiments, entity identification program 122 utilizes the extracted entity mentions to locate additional information elsewhere in the corpus of documents that may have been previously overlooked by the query of database 144. In various embodiments, entity identification program 122 calculates the distance of each entity mention to the identifiers. In various embodiments, entity identification program 122 calculates the entity score for each determined entity name and entity identification program 122 generates an entity profile.

In one example embodiment, entity identification program 122 utilizes the identifier bocce court 304 to identify an entity name by querying the corpus of documents. In this example embodiment, entity identification program 122 receives, at least, passage of text 302 from the query of the corpus of documents. Additionally, entity identification program 122 utilizes SIRE to identify and extract entity mentions within the, at least, passage of text 302 that relate to identifier bocce court 304. In this example embodiment, SIRE extracts entity mention Friendly Park 306 as an entity relation to identifier bocce court 304.

In this example embodiment, entity identification program 122 utilizes the extracted entity mention Friendly Park 306 to locate additional information within the corpus of documents in relation to the extracted entity mention entity Friend Park 306. This example embodiment provides that entity identification program 122 queries the corpus of documents to identify and extract additional information related to the extracted entity mention Friendly Park 306. In this example embodiment, entity identification program 122 identifies additional information that includes, but not limited to, (i) an address, (ii) hours of operation, (iii) costs associated with rentals of the identifier bocce court 304, etc. and extracts the additional information. Entity identification program 122 calculates the distances of the extracted entity mention Friendly Park 306 and the additional information to the identifier bocce court 304. In this example embodiment, the entity distance is calculated by entity_distances ("Friendly Park", "Bocce court")=10−1=9. In this example embodiment, entity identification program 122 calculates the entity score of the extracted entity mention Friendly Park 306 and the additional information are within a threshold value that entity identification program 122 determines that the extracted entity mention Friendly Park 306 and the additional information are related to the identifier bocce court 304. In this example embodiment, the entity score is calculated as follows: entity_score("Friendly Park", "Bocce court")=1/sum(9)=.11. In this example embodiment, entity identification program 122 generates an entity profile, wherein the entity profile communicates the extracted entity mention Friendly Park 306 and the additional information to the user of client device 130.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
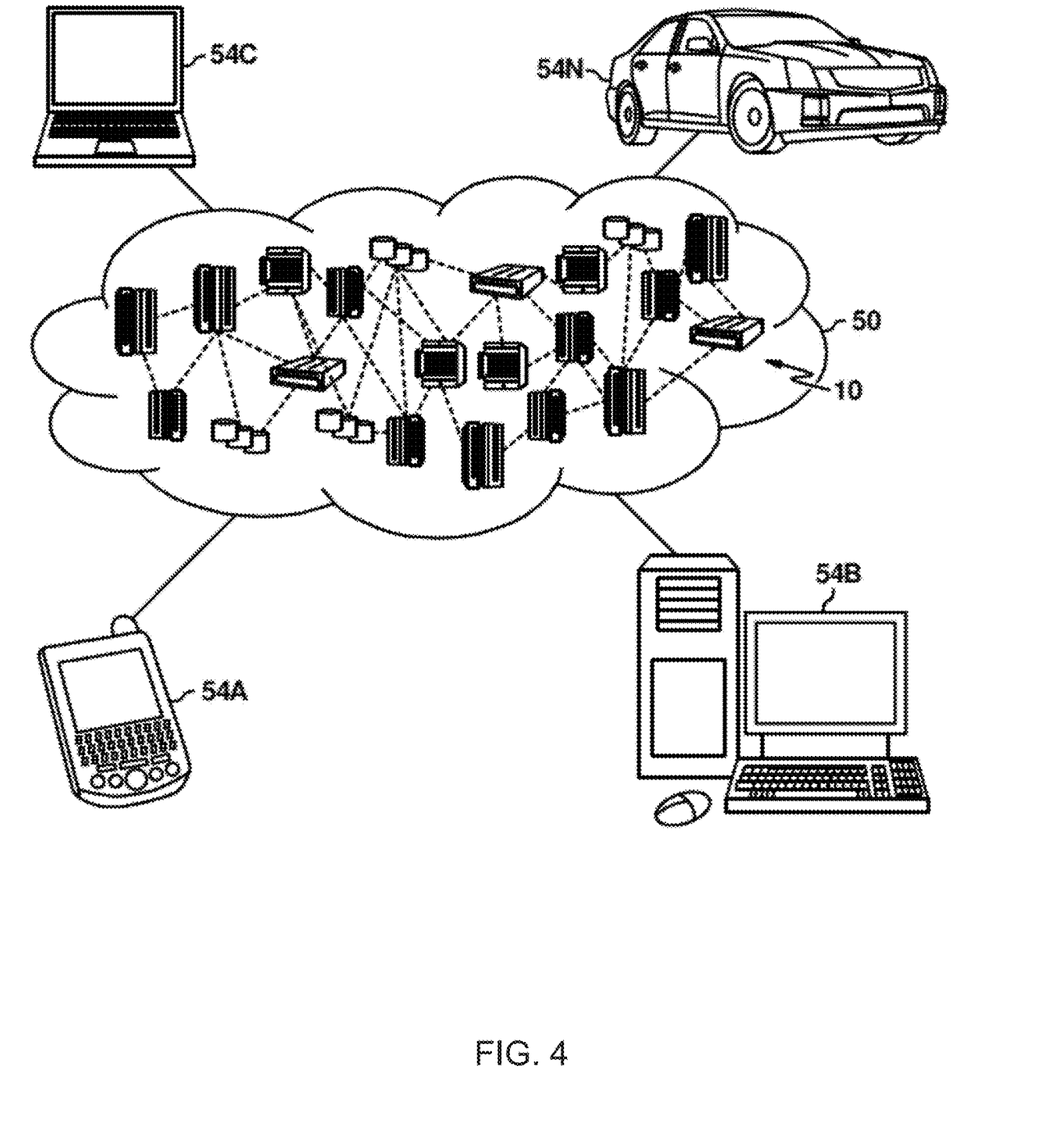
FIG. 4 depicts a cloud computing environment according to at least one embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
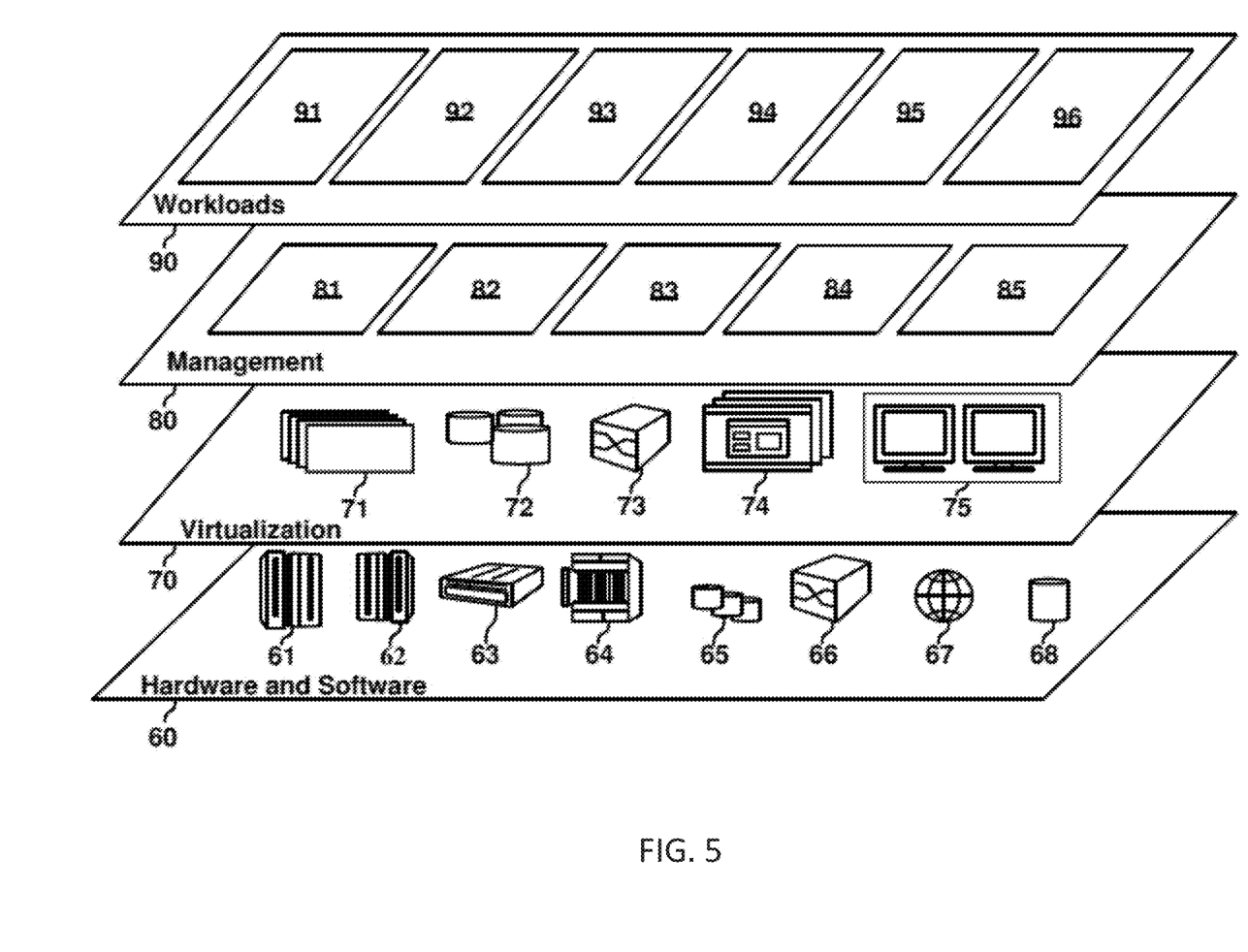
FIG. 5 depicts abstraction model layers according to at least one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
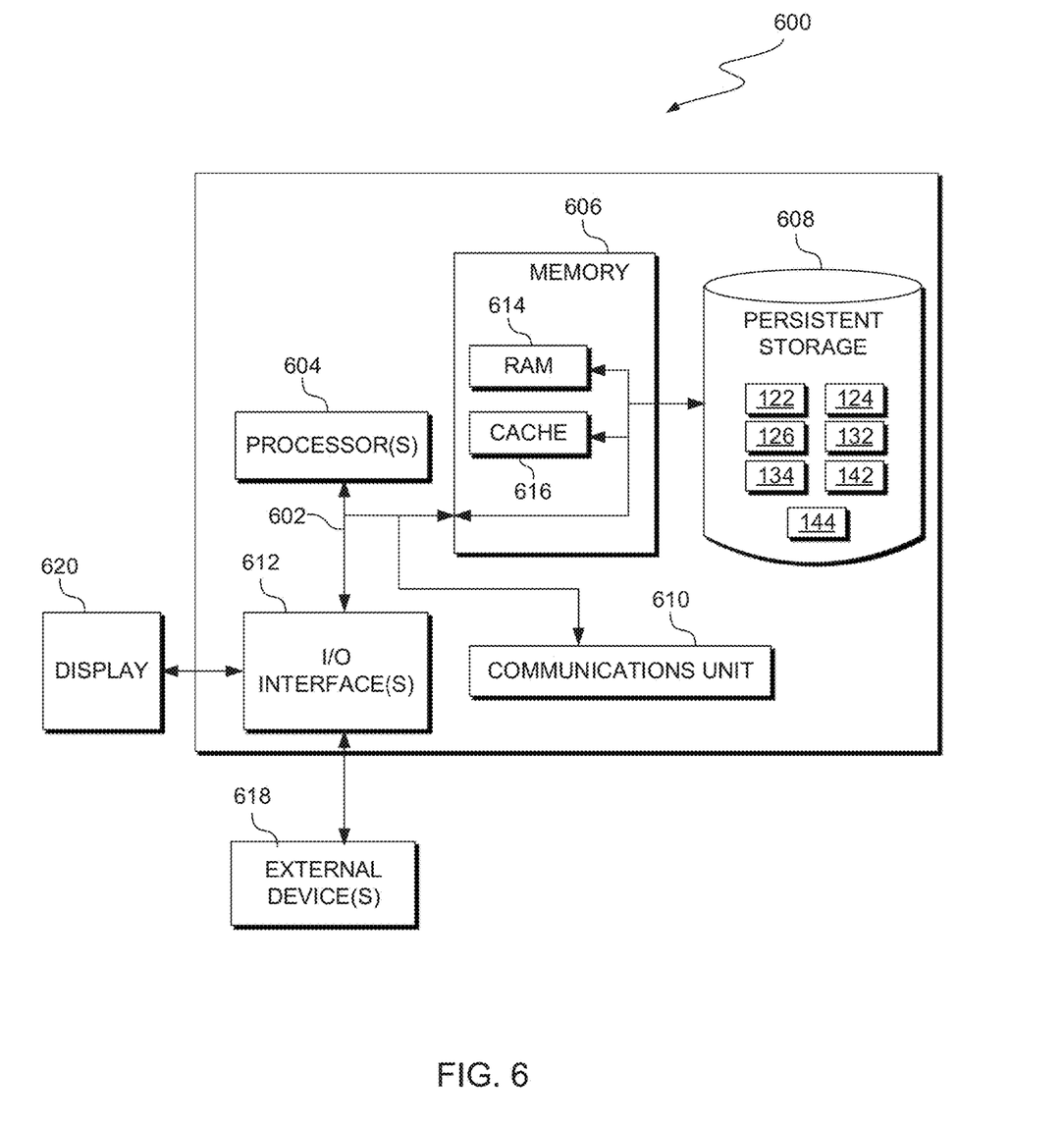
FIG. 6 depicts a block diagram of components of one or more computing devices within the computing environment depicted in FIG. 1, in accordance with an embodiment of the present invention.

FIG. 6 depicts a block diagram, 600, of components of computer system 120, client device 130, and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing system 120, client device 130, and storage area network (SAN) 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Data classifier program 122, computer interface 124, client application 132, client interface 134, server application 142, and database 144 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Data classifier program 122, computer interface 124, client application 132, client interface 134, server application 142, and database 144 may be downloaded to persistent storage 508 through communications unit 610.

I/O interface(s) 612 allows for input and output of data with other devices that may be connected to computing system 120, client device 130, and SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., data classifier program 122, computer interface 124, client application 132, client interface 134, server application 142, and database 144, can be stored on such portable computer-readable storage media and can be loaded onto persistent storage 608 via I/O interface(s) 612. I/O interface(s) 612 also connect to a display 620.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method comprising:
receiving, by one or more processors, a request to search a corpus of documents for an entity, wherein the request includes a non-name identifier of the entity;
identifying, by one or more processors, one or more likely variants of the non-name identifier of the entity, wherein likely variants are determined according to a class of the non-name identifier;
identifying, by one or more processors, entries of text within the corpus of documents that reference any variant of the identified likely variants of the non-name identifier;
applying, by one or more processors, natural language processing (NLP) to content associated with the identified entries within the corpus of documents, wherein the NLP identifies candidate entities associated with any variant of the identified likely variants of the non-name identifier;
determining, by one or more processors, an entity score for each candidate entity, wherein the entity score for a candidate entity is based, at least in part, on an inverse of a sum of the distances between the candidate entity and the references to the non-name identifier in the identified entries;
selecting, by one or more processors, an entity from the candidate entities based, at least in part, on the determined entity scores for the candidate entities, distances between the candidate entities, and references to any variant of the identified likely variants of the non-name identifier in the identified entries; and
returning, by one or more processors, the selected entity to a submitter of the request.

2. The computer-implemented method of claim 1, wherein the candidate entities are within a threshold value of distance from the non-name identifier.

3. The computer-implemented method of claim 1, the method further comprising:

determining, by one or more processors, the distances between the candidate entities and the references to the non-name identifier, wherein the distances are token distances.

4. The computer-implemented method of claim 1, the method further comprising:
generating, by one or more processors, a syntactic parse tree, wherein the syntactic parse tree includes (i) leaf nodes that represent the candidate entities, and (ii) branch nodes that represent the references to the non-name identifier; and
determining, by one or more processors, the distances between the candidate entities and references to the non-name identifier, wherein the distances are defined based, at least in part, on the syntactic parse tree.

5. The computer-implemented method of claim 1, wherein the class of the identifier is selected from the group consisting of: phone number, physical address, email address, and contact associations.

6. The computer-implemented method of claim 5, the method further comprising:
generating, by one or more processors, an entity profile, wherein the entity profile includes (i) the selected entity, (ii) one or more additional candidate entities with respective entity scores above a threshold, and (iii) a collection of information pertaining to the selected entity and the one or more additional candidate entities; and
sending, by one or more processors, the generated entity profile to the submitter of the request.

7. A computer program product comprising:
one or more computer-readable storage media and program instructions stored on the one or more computer-readable storage media, the stored program instructions comprising:
program instructions to receive a request to search a corpus of documents for an entity, wherein the request includes a non-name identifier of the entity;
program instructions to identify one or more likely variants of the non-name identifier of the entity, wherein likely variants are determined according to a class of the non-name identifier;
program instructions to identify entries of text within the corpus of documents that reference any variant of the identified likely variants of the non-name identifier;
program instructions to apply natural language processing (NLP) to content associated with the identified entries within the corpus of documents, wherein the NLP identifies candidate entities associated with any variant of the identified likely variants of the non-name identifier;
program instructions to determine an entity score for each candidate entity, wherein the entity score for a candidate entity is based, at least in part, on an inverse of a sum of the distances between the candidate entity and the references to the non-name identifier in the identified entries;
program instructions to select an entity from the candidate entities based, at least in part, on the determined entity scores for the candidate entities, distances between the candidate entities and references to the any variant of the identified likely variants of non-name identifier in the identified entries; and
program instructions to return the selected entity to a submitter of the request.

8. The computer program product of claim 7, wherein the candidate entities are within a threshold value of distance from the non-name identifier.

9. The computer program product of claim 7, the stored program instructions further comprising:
program instructions to determine the distances between the candidate entities and the references to the non-name identifier, wherein the distances are token distances.

10. The computer program product of claim 7, the stored program instructions further comprising:
program instructions to generate a syntactic parse tree, wherein the syntactic parse tree includes (i) leaf nodes that represent the candidate entities, and (ii) branch nodes that represent the references to the non-name identifier; and
program instructions to determine the distances between the candidate entities and references to the non-name identifier, wherein the distances are defined based, at least in part, on the syntactic parse tree.

11. The computer program product of claim 7, wherein the class of the identifier is selected from the group consisting of: phone number, physical address, email address, and contact associations.

12. The computer program product of claim 11, the stored program instructions further comprising:
program instructions to generate an entity profile, wherein the entity profile includes (i) the selected entity, (ii) one or more additional candidate entities with respective entity scores above a threshold, and (iii) a collection of information pertaining to the selected entity and the one or more additional candidate entities; and
program instructions to send the generated entity profile to the submitter of the request.

13. A computer system, the computer system comprising:
one or more computer processors;
one or more computer readable storage medium; and
program instructions stored on the computer readable storage medium for execution by at least one of the one or more processors, the stored program instructions comprising:
program instructions to receive a request to search a corpus of documents for an entity, wherein the request includes a non-name identifier of the entity;
program instructions to identify one or more likely variants of the non-name identifier of the entity, wherein likely variants are determined according to a class of the non-name identifier;
program instructions to identify entries of text within the corpus of documents that reference any variant of the identified likely variants of the non-name identifier;
program instructions to apply natural language processing (NLP) to content associated with the identified entries within the corpus of documents, wherein the NLP identifies candidate entities associated with any variant of the identified likely variants of the non-name identifier;
program instructions to determine an entity score for each candidate entity, wherein the entity score for a candidate entity is based, at least in part, on an inverse of a sum of the distances between the candidate entity and the references to the non-name identifier in the identified entries;
program instructions to select an entity from the candidate entities based, at least in part, on the determined entity scores for the candidate entities, distances between the candidate entities and references to the any variant of the identified likely variants of non-name identifier in the identified entries; and program instructions to return the selected entity to a submitter of the request.

14. The computer system of claim 13, wherein the candidate entities are within a threshold value of distance from the non-name identifier.

15. The computer system of claim 13, the stored program instructions further comprising:

program instructions to determine the distances between the candidate entities and the references to the non-name identifier, wherein the distances are token distances.

16. The computer system of claim 13, the stored program instructions further comprising:

program instructions to generate a syntactic parse tree, wherein the syntactic parse tree includes (i) leaf nodes that represent the candidate entities, and (ii) branch nodes that represent the references to the non-name identifier; and program instructions to determine the distances between the candidate entities and references to the non-name identifier, wherein the distances are defined based, at least in part, on the syntactic parse tree.

17. The computer system of claim 13, wherein the class of the identifier is selected from the group consisting of: phone number, physical address, email address, and contact associations.

* * * * *